Feb. 17, 1948.   G. W. JOHNSON   2,436,214
POULTRY PLUCKING MACHINE
Filed May 12, 1945   3 Sheets-Sheet 1

INVENTOR,
Gordon W. Johnson
BY Roy E. Hamilton
Attorney.

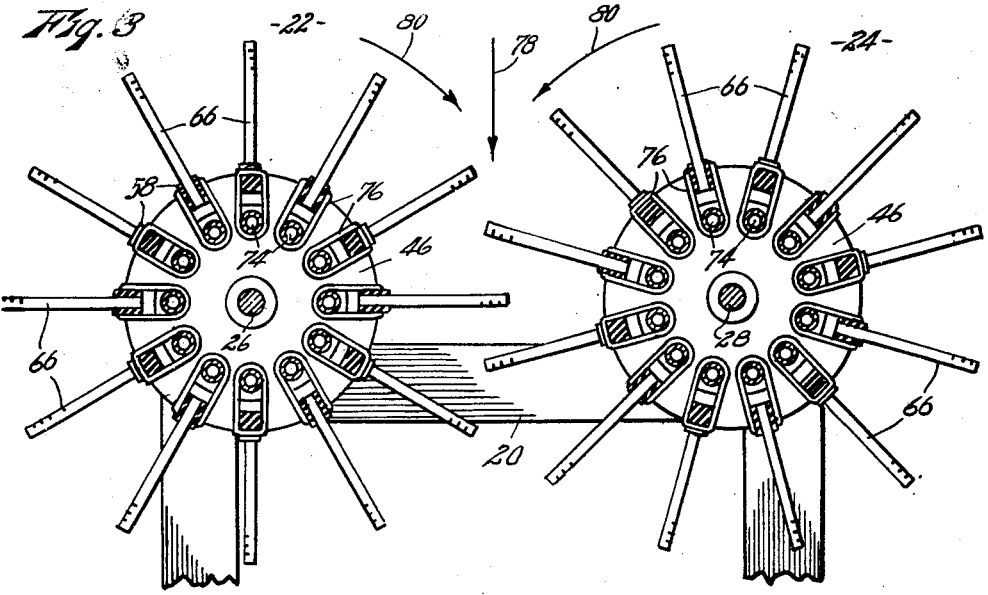
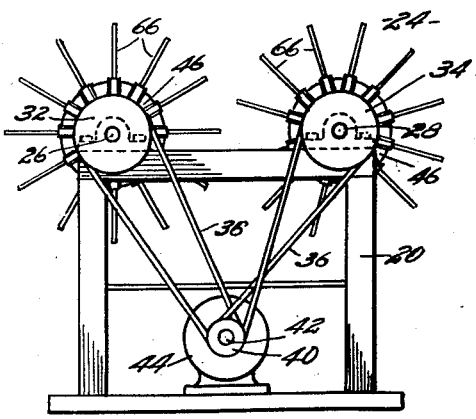
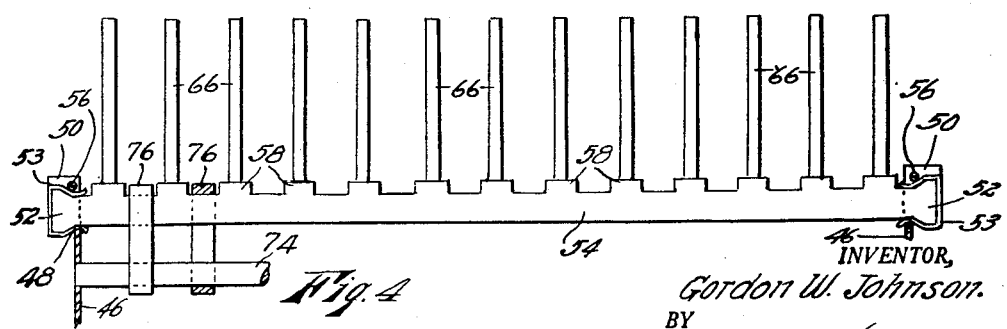

Feb. 17, 1948. G. W. JOHNSON 2,436,214
POULTRY PLUCKING MACHINE
Filed May 12, 1945 3 Sheets-Sheet 3
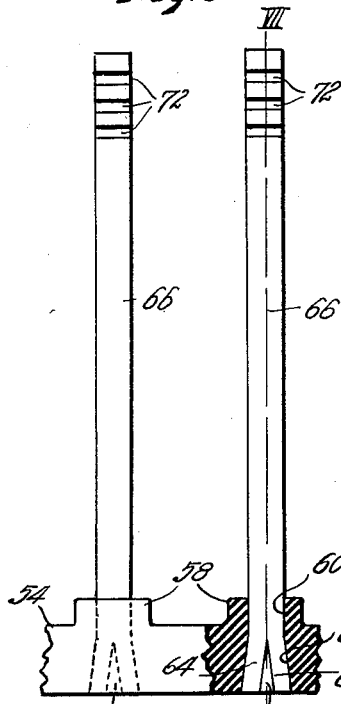
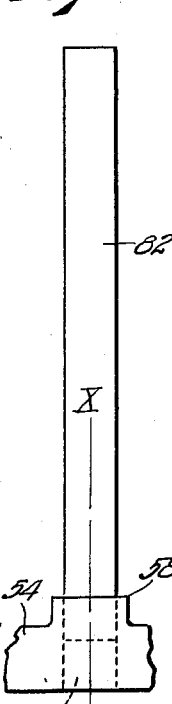
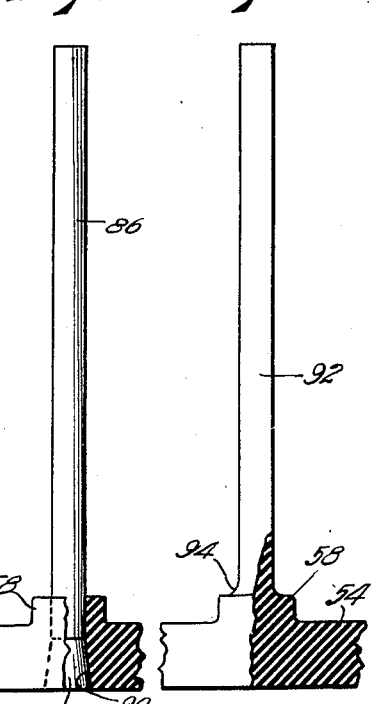
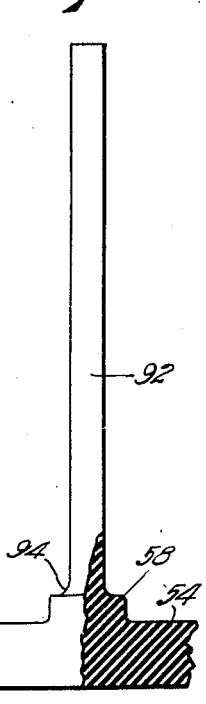
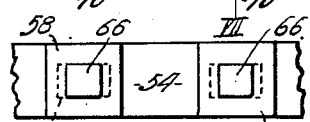
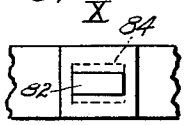
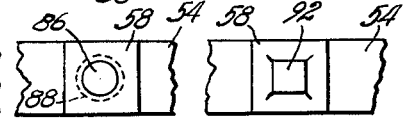
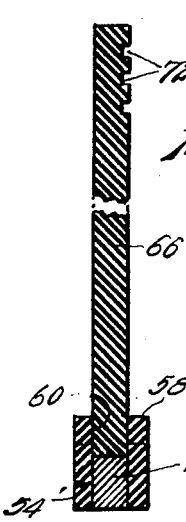
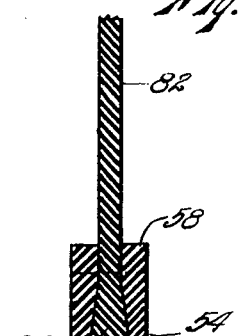
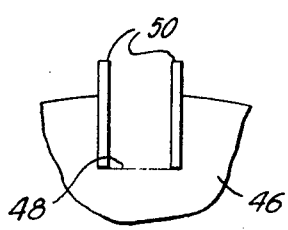
INVENTOR,
Gordon W. Johnson.
BY
Roy E. Hamilton,
Attorney.

Patented Feb. 17, 1948

2,436,214

UNITED STATES PATENT OFFICE 2,436,214

POULTRY PLUCKING MACHINE

Gordon W. Johnson, Raytown, Mo., assignor to Gordon Johnson Company, Kansas City, Mo., a corporation of Missouri Application May 12, 1945, Serial No. 593,423

8 Claims. (Cl. 17—11.1)

1

This invention relates to poultry plucking machines and has reference to a machine of this character having rotatable drums provided with radially disposed rubber fingers adapted to impinge against poultry and strip the feathers therefrom as the fowl is positioned between the drums.

The principal object of the present invention is the provision of a poultry plucking machine having a series of feather engaging fingers mounted on an elastic bar secured at its opposite ends to spaced apart drum discs whereby when said drum is rotated, said elastic bars will be moved outwardly from the axis of said drum by centrifugal action.

Another object is the provision of a poultry plucking machine having elongated rubber fingers removably mounted in an elastic cross bar.

Other objects are simplicity and economy of construction, ease and efficiency of operation and adaptability for plucking all sizes and shapes of poultry.

With the above, and other objects in view, the invention consists of certain novel details of construction and combination of parts hereinafter fully described and claimed, it being understood that various modifications may be made within the scope of the appended claims without departing from the spirit or sacrificing any of the advantages of the invention.

Reference will now be had to the drawings wherein:

Fig. 2 is an end elevational view of the machine shown in Fig. 1.

Fig. 3 is an enlarged fragmentary cross sectional view taken on line III—III of Fig. 1.

Fig. 4 is an enlarged fragmentary sectional view taken on line IV—IV of Fig. 1.

Fig. 5 is an enlarged front elevation partly in section of feather engaging fingers mounted in an elastic bar with parts broken away.

Fig. 6 is a plan view of the fingers and the bar shown in Fig. 5.

Fig. 7 is a foreshortened vertical section taken on line VII—VII of Fig. 5.

Fig. 8 is an elevational view of a modified form of the feather engaging finger and mounting.

Fig. 9 is a plan view of the finger and bar shown in Fig. 8.

Fig. 10 is a vertical sectional view taken on line X—X of Fig. 8.

2

Figure 1:
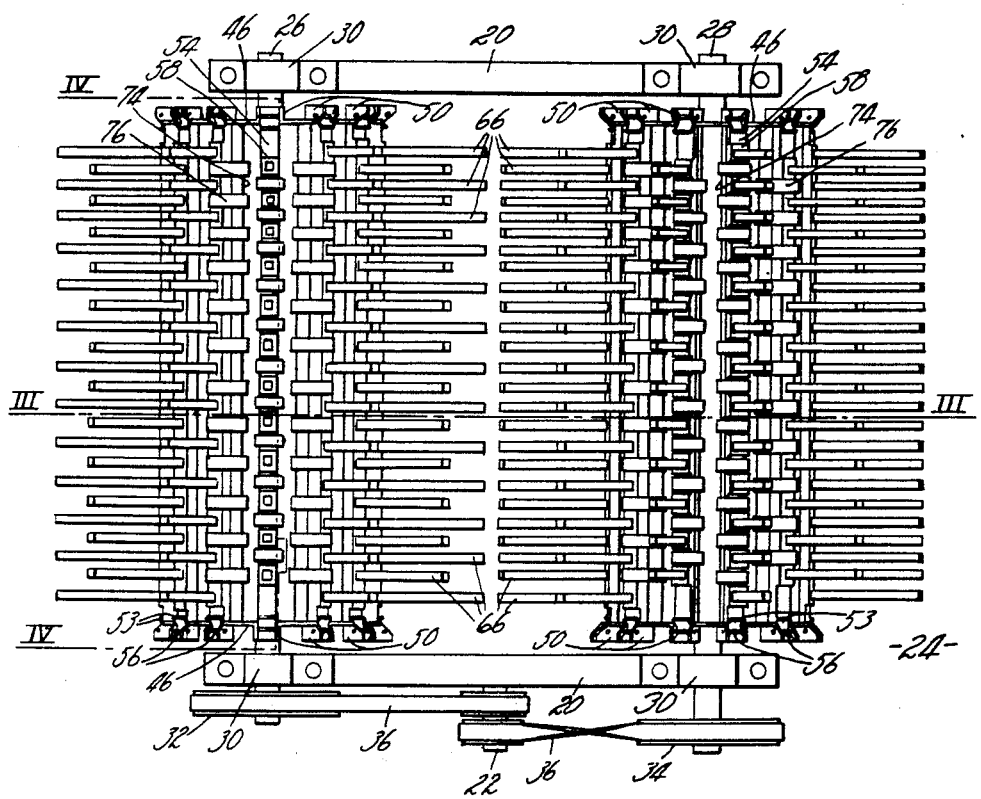
Figure 1 is a plan view of a poultry plucking machine constructed in accordance with this invention.

Fig. 11 is an elevational view of another modified form of the feather engaging finger with parts broken away.

Fig. 12 is a plan view of the finger and bar shown in Fig. 11.

Fig. 13 is an elevational view partly in section of a further modified form of the feather engaging finger and associated elastic bar wherein these parts are made integral.

Fig. 14 is a plan view of the modified form shown in Fig. 13.

Fig. 15 is an enlarged elevational view showing conformation of disc 46, flanges 50 and slot 48.

Throughout the several views like reference characters refer to similar parts and the numeral 20 designates a frame or housing suitably shaped to receive a pair of feather stripping drums 22 and 24 mounted for rotation with shafts 26 and 28 respectively which are rotatably mounted in bearings 30 carried by said frame. The shafts 26 and 28 are disposed in substantially parallel relation and are provided at their outer end portions with belt wheels 32 and 34 respectively. These belt wheels 32 and 34 are respectively interconnected by belts 36 to drive belt wheels 38 and 40 mounted on shaft 42 of motor 44. It will be noted that one of the belts is crossed, while the other is straight, thus causing the drums to rotate in opposite directions as the motor is energized.

Each of the feather engaging drums 22 and 24 is provided with a pair of spaced apart discs 46 concentrically disposed to the respective shafts and secured for rotation therewith. Each of said discs is provided with a series of notches 48 at its periphery and each notch is provided with outturned flanges 50 between which the head 52 of an elastic bar 54 is positioned. The head of the elastic bar is larger than the body of the bar and is secured in position on the disc by resting against the bottom of notch 48 and against a pin 56 which extends transversely thereabove through flanges 50. Each head 52 is preferably provided with a clip 53 made of metal whereby the head is held in proper form to facilitate proper anchorage. These elastic bar members are substantially parallel with the axis of the drums and are secured normally under tension by securing their opposite ends in like manner to the respective drum discs.

Each elastic bar is provided with a series of spaced apart projections 58 through which openings 60 are formed to extend entirely through the elastic bar. The inner end portion of said hole is enlarged at 62 to receive the expanded head 64 of feather engaging finger 66. It will be noted that the enlarged portion of opening 60 extends about half way through the bar and projection thus providing a proper insertion of the squared portion of the finger 66 in the body of the supporting member. In order to provide the proper head 64 for the finger 66, the finger is first slit outwardly from its inner end at 68 and then a wedge shaped member 70, made of rubber or any other suitable material, is inserted into said slit to spread apart the outer walls of the finger. In order to position the finger in the elastic strip, the small end of the finger is inserted through opening 60 and is drawn to position until the head takes the position shown in Fig. 5. Due to the wedge insert, the head cannot pass through the hole 60, neither will it have any tendency to be dislodged inwardly. These feather engaging fingers may be provided with transverse slots 72 along their working face.

Referring to Fig. 1, it will be observed that the fingers are disposed at equal spaced apart distances along the outer face of said elastic bar and that the fingers of adjacent elastic bars are disposed in offset or staggered relation. The elastic bars are preferably equally spaced about the periphery of the drum so that a uniform and balanced action of the drum is obtained during the picking operation.

Since the bars 54 are more or less elastic, the centrifugal force set up during the rotation of the drum will tend to expand the drum and this expansion will increase to a point adjacent the central transverse plane of the drum. In order to overcome this objection and to maintain the drum in substantially cylindrical form during the picking operation, the following means is provided for limiting the outward movement of the elastic member throughout its length. For this purpose each elastic bar is provided with a parallel tube 74 opposite ends of which are securely mounted in drum discs 46 between the drum axis and the inner wall of the elastic member. About this tube and the elastic member is positioned a flexible tube section 76 which is normally loosely fitted but which will be extended to permit a predetermined movement outwardly of the elastic bar during the rotation of the drum.

It will be noted that the members 76 are disposed between the adjacent projections 58, thus preventing objectionable movement of the tube sections along the tube 74.

Referring to Fig. 3, wherein the fingers are shown in substantially the position they will take during the picking operation, it will be noted that the fingers are slightly interdigitated. Furthermore, the degree of interdigitation may be varied by varying the size of the tubular restraining members 76 or in some cases it might be found practical to eliminate all interdigitation of the fingers.

The point of introduction of the fowl carcass to the picking machine is at the point and in the direction of the arrow 78 in Fig. 3, with the picking drums rotating in the directions indicated by the arrows 80. Due to the flexibility of fingers 66 and the fact that it is contemplated to make them of rubber, there would normally be a slight lag of the fingers at their outer ends and furthermore, there would be a tendency to slightly twist the elastic band 54. Also, as the carcass is moved into the path of travel of the fingers, they will be moved from their normal path of travel due to contact with the feathers of the bird. Due to this flexibility of the parts, it is quite evident that any fowl carcass, regardless of size or shape, passed between the two drums 22 and 24, will be definitely contacted by the rapidly rotating fingers 66, thus removing the feathers therefrom.

Referring to the modified forms of finger shown in Figs. 8, 9 and 10 it will be observed that the finger 82 is of a moulded rubber type with a head 84 formed integral therewith. This head is of sufficient size to prevent movement of the finger outwardly through the elastic bar 54. Referring to Fig. 9, it will be observed that this finger is of a rectangular strap type, thus contacting a larger area of the bird's body.

The modified form shown in Figs. 11 and 12 provides a finger 86 of circular cross section having a frusto-conical head 88 suitable for snugly fitting in the opening 90 formed through the elastic cross bar.

Figs. 13 and 14 provide a unitary structure wherein the elastic bar 54, projections 58 and the feather contacting fingers 92 are moulded from one piece of material. A fillet 94 at the junction of the finger with the projection 58 serves to prevent excessive breakage at this point.

It is thought that I have set forth and described a poultry picking machine having flexible feather engaging members which are very durable and effective and one in which the feather engaging fingers when worn out or damaged, may be easily removed and replaced by new fingers.

Having thus described my invention, what I claim as new and desire to be secured by Letters Patent is:

1. A feather engaging drum for a poultry plucking machine comprising a pair of spaced apart discs mounted for rotation with a drum axle, a series of elastic bars mounted about the periphery of said drum and between said discs and removably secured thereto at their opposite ends, and elongated feather engaging fingers extending outwardly from said elastic bars.

2. A feather engaging drum for a poultry plucking machine comprising a pair of spaced apart end discs concentrically mounted on a drum axle, a series of elastic bars mounted in spaced apart relation about the periphery of said drum and secured at their opposite ends respectively to said discs, elongated feather engaging fingers removably secured to each of said bars, and means to rotate said drum.

3. A poultry plucking machine including a rotatable drum having a pair of spaced apart end discs and a series of elastic bars secured at their end portions to extend between said discs, feather engaging fingers extending outwardly from said elastic bars, and means to rotate said drum.

4. A poultry plucking machine comprising a rotatable drum having a pair of spaced apart end discs and a series of elastic bars each secured at its opposite ends respectively to said discs to extend therebetween and a series of elongated feather engaging fingers removably anchored in spaced apart relation in each of said elastic bars.

5. A poultry plucking machine including an annular rotatable member having a series of spaced apart elastic bars substantially parallel with the axis of rotation of said annular member and a plurality of elongated feather engaging fingers removably mounted to extend outwardly from each of said elastic bars.

6. A poultry plucking machine including an annular rotatable member having a series of spaced apart elastic bars substantially parallel with the axis of rotation of said annular member, a plurality of elongated feather engaging fingers removably mounted to extend outwardly from each of said elastic bars, and means to limit the outward movement of said elastic bars due to centrifugal force as the member is rotated.

7. In a poultry plucking machine a rotatable drum, an elastic bar mounted longitudinally on said drum and having transverse holes formed therethrough, and elongated feather engaging fingers removably mounted in the holes of said elastic bar to extend outwardly therefrom.

8. In a poultry plucking machine a rotatable drum, an elastic bar mounted longitudinally on said drum and having transverse holes formed therethrough, elongated feather engaging fingers removably mounted in the holes of said elastic bar to extend outwardly therefrom, and a head formed on the inner end of each of said fingers to prevent the passage of the fingers entirely through said elastic bar.

GORDON W. JOHNSON.

REFERENCES CITED

The following references are of record in the file of this patent:

UNITED STATES PATENTS

| Number | Name | Date |
| --- | --- | --- |
| 573,734 | Webster | Dec. 22, 1896 |
| 2,302,525 | Campbell | Nov. 17, 1942 |